United States Patent [19]

Doty

[11] Patent Number: 4,708,364

[45] Date of Patent: Nov. 24, 1987

[54] SEAT BELT RETRACTION APPARATUS INCLUDING AN INERTIA SENSOR

[75] Inventor: Gerald A. Doty, Drown Point, Ind.

[73] Assignee: Gateway Industries, Inc., Olympia Fields, Ill.

[21] Appl. No.: 835,604

[22] Filed: Apr. 11, 1986

[51] Int. Cl.$^4$ ............................................. B60R 21/10
[52] U.S. Cl. ..................................... 280/806; 280/801
[58] Field of Search ..................... 242/107.7; 280/802, 280/806, 808, 801; 297/474–478; 180/268

[56] References Cited

U.S. PATENT DOCUMENTS

| | | | |
|---|---|---|---|
| 3,764,161 | 10/1973 | Bright et al. | 280/803 |
| 3,797,603 | 3/1974 | Loomba | 280/806 |
| 4,209,186 | 6/1980 | Close | 280/806 |
| 4,235,455 | 11/1980 | Collins et al. | 280/806 |
| 4,280,584 | 7/1981 | Makishima | 280/806 |
| 4,315,639 | 2/1982 | Booth et al. | 280/803 |
| 4,361,294 | 11/1982 | Doty | 280/802 |
| 4,451,062 | 5/1982 | Ziv | 280/806 |
| 4,461,493 | 7/1984 | Doty | 280/807 |
| 4,545,546 | 10/1985 | Kawaguchi et al. | 280/806 |

Primary Examiner—Richard A. Bertsch
Attorney, Agent, or Firm—Fitch, Even, Tabin & Flannery

[57] ABSTRACT

Seat belt retraction apparatus including a seat belt retractor mechanism, an inertia sensor and an electrical circuit interconnected with the inertia sensor and the retractor mechanism. The retractor mechanism includes a reel and a reel locking mechanism for locking the reel against unwinding of the strap of the seat belt wound around the reel. The illustrated reel locking mechanism includes a pawl which is engageable with ratchet wheels on the reel to prevent the reel from paying out the strap. This pawl is movable between a first position in which the pawl is out of locking engagement with the ratchet wheels and a second position in which the pawl engages the wheels to lock the reel against extension of the strap. An electromagnetic device including a coil is provided for controlling movement of the pawl. The inertia sensor is carried on the vehicle chassis and has a piezoelectric disc. The sensor also includes an inertia weight such as a pendulum for changing the shape of the disc so that the sensor provides an output signal in response to a change in velocity of the vehicle. The electrical circuit is responsive to the operation of the inertia sensor to energize the coil.

11 Claims, 6 Drawing Figures

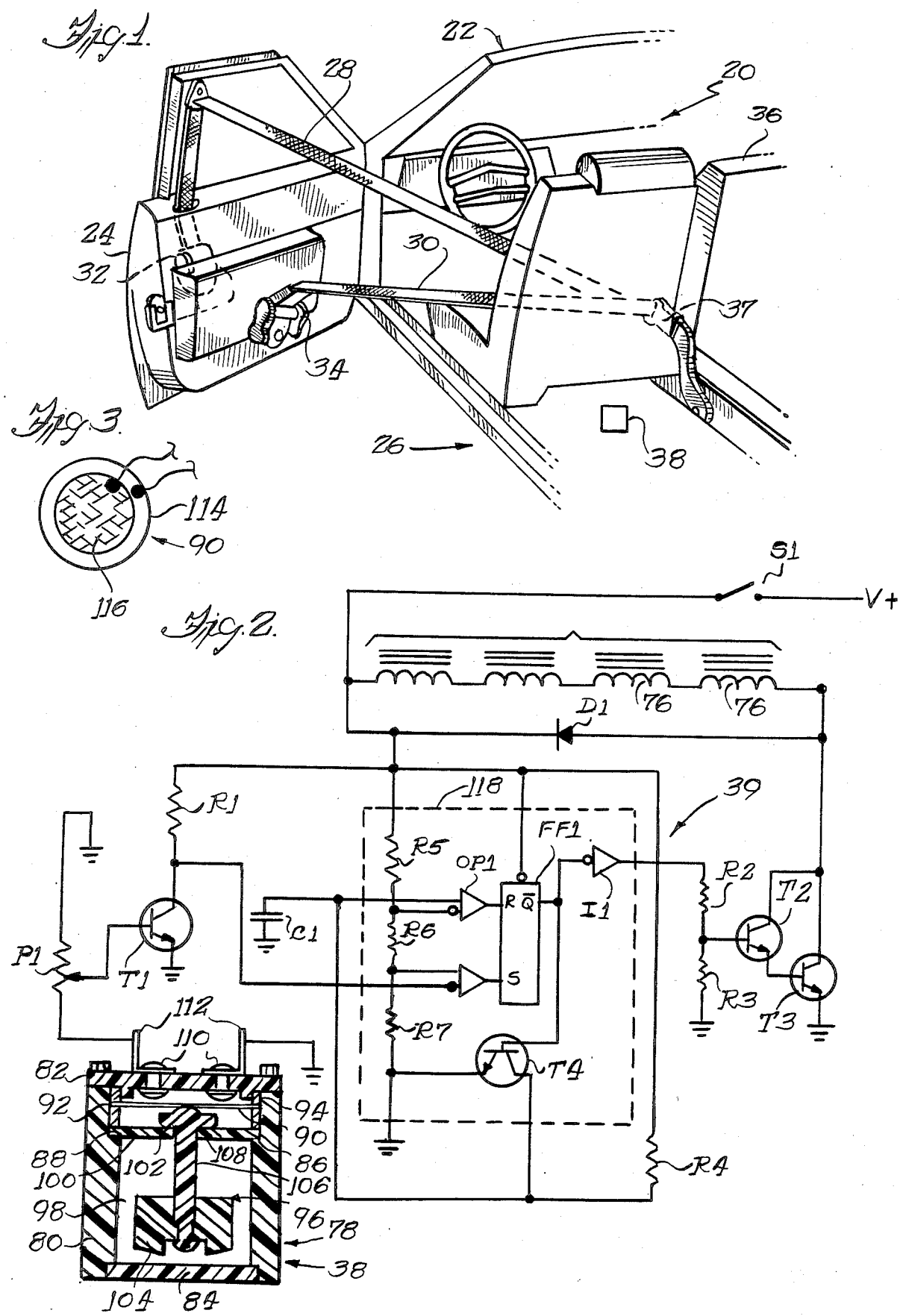

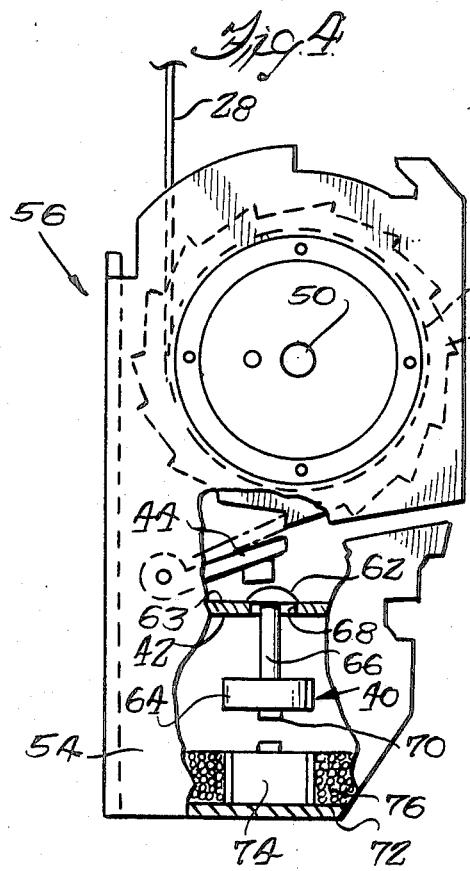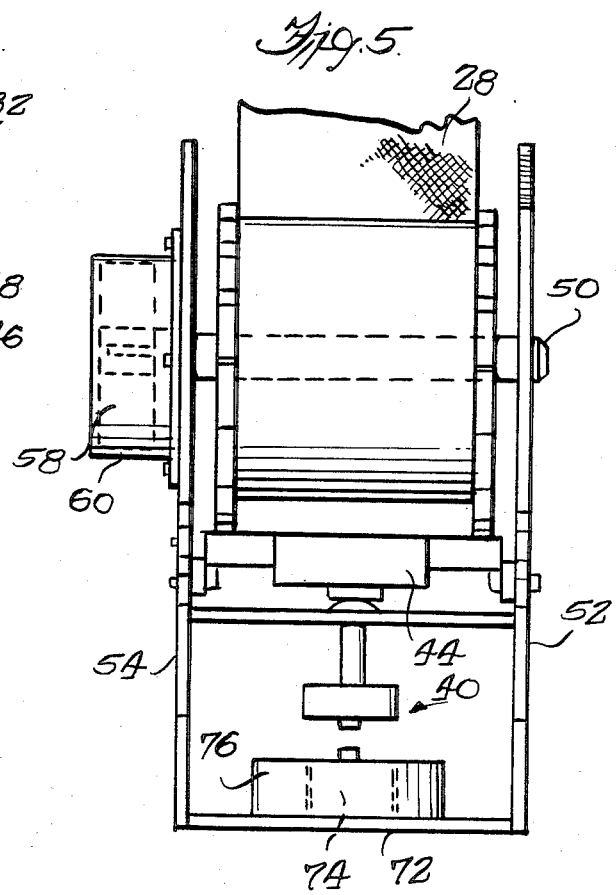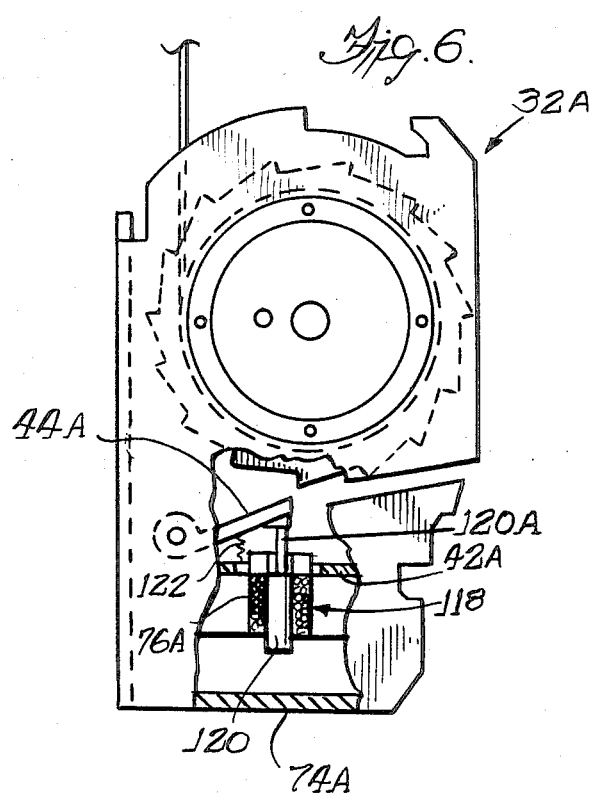

SEAT BELT RETRACTION APPARATUS INCLUDING AN INERTIA SENSOR

The present invention relates to seat belt retraction apparatus and, more specifically, to such apparatus including an inertia sensor for controlling locking of the seat belt strap.

BACKGROUND OF THE INVENTION

Inertia sensors are mounted in vehicles to sense an inertia condition of a predetermined force or G level and to operate an electrical circuit for controlling operation of the seat belt retractor mechanism. A typical inertia sensor proposed heretofore comprises a rolling ball which rolls up a metal inclined surface to engage another metal surface with current then flowing through the ball and between the two metal surfaces to complete an electrical circuit. Such balls may be noisy in their travel and may be subject to malfunction if liquid or other material is able to coat the contacting surfaces. Other inertia sensors heretofore proposed, use an inertia weight such as a pendulum which swings at a predetermined acceleration or deceleration force to make or break electrical contacts. Electrical contacts are subject to burning or otherwise becoming corroded particularly in vehicles exposed to inclement or corrosive atmospheres. In addition to being reliable and having a long life, inertia sensors for use with seat belt retractor apparatus should also be relatively simple and sufficiently low in cost to compete with existing inertia sensors.

SUMMARY OF THE INVENTION

Among the aspects and objects of the present invention will be noted the provision of an improved seat belt retraction apparatus. This apparatus requires only a single inertia sensor which is preferably mounted on the vehicle chassis and which can control a plurality of seat belt retraction mechanisms mounted in the vehicle doors. The retraction mechanism can be controlled as to the time that the various belts are locked. The inertia sensor incorporates a piezoelectric device in the form of a disc, and a pendulum which deflects the disc upon a sudden change of velocity so that the sensor provides an output signal upon a change in acceleration of the vehicle. The apparatus of the present invention is reliable in use, has long service life, and is relatively simple and economical to manufacture. Other aspects and features of the present invention will be, in part, apparent and, in part, pointed out hereinafter in the following specification and accompanying claims and drawings.

Briefly, the seat belt retraction apparatus of the present invention includes a seat belt retraction mechanism having a reel about which the strap of the seat belt is wound, and which is adapted to take up and let out the strap. The reel is locked against strap protraction by a reel locking means which preferably is in the form of a pair of ratchet wheels mounted on the reel and a pawl pivoted into locking engagement with the ratchet wheels. The apparatus further includes an inertia sensor preferably mounted on the vehicle chassis and incorporating a piezoelectric device and means for changing the shape of the device so that the device provides an output signal in response to a change in velocity of the vehicle. An electrical circuit is interconnected with the sensor and the coil and includes control means response to operation of the sensor to change the state of energization of the coil so that a change in velocity of the vehicle causes the pawl to move to its locking position.

BRIEF DESCRIPTION OF THE DRAWINGS

FIG. 1 illustrates a vehicle having a passive restraint system including a seat belt retraction apparatus embodying various features of the present invention and including one or more seat belt retraction mechanisms, a piezoelectric inertia sensor and an electrical circuit interconnecting the sensor and retraction mechanism;

FIG. 2 is a cross-sectional view of the piezoelectric inertia sensor interconnected with the electrical circuit, illustrated in schematic form, which controls energization of an electromagnetic coil in the belt retraction mechanism;

FIG. 3 is a plan view of a piezoelectric device incorporated in the sensor of FIG. 2;

FIG. 4 is a side elevational view of the belt retraction mechanism, incorporating a magnetically biased pendulum, included in the apparatus of FIG. 1;

FIG. 5 is a front elevational view of the belt retraction mechanism of FIG. 4; and FIG. 6, similar to FIG. 4, illustrates an alternative embodiment of the belt retractor mechanism wherein a solenoid is used to effect locking, instead of a pendulum.

Corresponding reference characters indicate corresponding components throughout the several views of the drawings.

DESCRIPTION OF THE PREFERRED EMBODIMENT

Referring now to the drawings, seat belt retraction apparatus embodying various features of the present invention is generally indicated in FIG. 1 by reference numeral 20. The apparatus 20 is for use in a vehicle 22 having at least one door 24 and a chassis 26. As used herein, the term "seat belt" is to be accorded its broad meaning which includes a shoulder strap 28 and/or a lap belt 30. As shown in FIG. 1, the seat belt retraction apparatus 20 includes a seat belt retractor mechanism 32 for the shoulder strap and a retractor mechanism 34 for the lap belt. The retractor mechanisms are mounted on the door 24 to form part of a passive restraint system which functions to hold a vehicle occupant without his or her taking any steps to strap in, such as extending a belt and inserting a metal tongue attached to that belt into an anchored buckle. Upon the occupant closing the door, the strap 28 and belt 30 are moved about the occupant and slack is taken up by the mechanisms 32 and 34.

The distal ends of the strap 28 and the belt 30 may be held by anchored buckles disposed adjacent the center of the front seat 36 and the retractor mechanisms have rewinding means to take up the slack as the seated occupant swings the door 24 closed. Alternatively, the strap 28 and the belt 30 could be two runs of a length of webbing, the ends of which are held by the mechanisms 32, 34. The apparatus 20 further includes an inertia sensor 38 mounted on the chassis 26 and interconnected with an electrical circuit 39, shown in FIG. 2, for controlling operation of the retractor mechanisms 32, 34 upon the vehicle experiencing a sudden change in velocity to lock the mechanisms from paying out their respective strap and belt. Thus, the restraint system prevents the occupant from being thrown forward in the event of a crash.

As the retractor mechanisms 32 and 34 may be substantially identical, only mechanism 32 need be described in any detail. Referring to FIGS. 4 and 5, the retractor mechanism 32 is of the inertia operated kind and comprises an inertia weight 40 which is moved with predetermined deceleration or acceleration forces. The inertia weight may be a top-heavy toppling type of weight or it may be, as shown herein, a pendulum weight mounted on support bar 42 for swinging movement to operate a pivotally mounted locking bar or pawl 44 by pivoting it into locking engagement with a pair of ratchet wheels 46 mounted on opposite sides of a webbing reel 48 mounted for rotation on a reel shaft 50 extending between opposite vertical frame sides 52 and 54 of a retractor frame 56. The reel shaft 50 is journaled to rotate in the side frames 52 and 54 and a spirally wound clock-like spring 58 is attached to one end of the reel shaft 50 to rewind the seat belt. This rewind spring 58 is mounted within a protective cover 60 attached to the side frame 54. The pawl 44 is pivotal between a first position (shown in FIG. 5) wherein the pawl 44 is out of engagement with the ratchet wheels 46, and a second or locking position (shown in FIG. 4) wherein the pawl 44 engages the teeth of the ratchet wheels 46 to lock the retractor mechanism 32 against extension of the strap 28. For further information regarding retractor mechanisms having such reels, ratchet wheels and pawls, reference may be made to commonly assigned U.S. Pat. Nos. 4,361,294 and 4,461,493, the teachings of which are incorporated herein by reference.

The pendulum 40 includes an enlarged head 62 which is rockable on the upper surface 63 of the support bar 42, a weighted lower end 64, and a stem 66 passing through an aperture 68 (having an inside diameter larger than the outside diameter of the stem 66 so that the stem can freely move in the aperture) and interconnecting the head 62 and the lower end 64. Attached dependent from the bottom of the weighted end 64 is a magnetizable means which may take the form of a piece of steel 70. The retractor frame 56 also has a base plate 72 interconnecting the lower ends of the frame sides 52, 54. Mounted on the base plate 72 is a permanent magnet 74 which attracts the piece of steel 70.

Without the presence of the steel 70 and the magnet 74, the pendulum could be designed to swing sufficiently to move the pawl to its locking position upon experiencing a change in velocity of about 0.7 G. With the steel and magnet, the pendulum is magnetically biased against swinging so that a force of 2.5 to 3 Gs would be required to move the pendulum 40 sufficiently to lock the retractor mechanism 32.

Also, disposed supported on the base plate 72 and concentric with the permanent magnet 74 is a coil 76 which, upon proper energization, forms an electromagnet which provides a magnetic field which is in the opposite sense (polarity) to that provided by the permanent magnet. The energization of the coil 76 may result in total cancellation of the field of the permanent magnet so that the pendulum 40 moves to lock the retractor mechanism under the lower force of 0.7 G.

One advantage of biasing the pendulum 40 against swinging to lock the retractor mechanism 32 until the higher G-force is experienced has to do with the mounting of the retractor mechanism in the vehicle door 24 as part of a passive restraint system. If the retractor could lock at the lower G-force, a rapid opening of the door would swing the pendulum 40 to lock the retractor mechanism. This would prevent pay out of the strap resulting in interference with movement of the door and stopping the occupant as he or she is in the act of getting out of the seat.

It will be appreciated that in the higher force condition, no energization of the coil is required. This is in sharp contrast to prior art lockout mechanisms which not only fail to provide the higher G-force operation feature, but also require energization of a solenoid to prevent operation of the retractor mechanism. If the door is left open and the solenoid remains energized for a long period, a serious drain on the battery may occur. Also, if the electrical power in the vehicle fails or if the electrical circuit for the coil 76 fails, the system will still lock at the higher G-force level.

In accordance with the present invention there is provided a new and improved inertia sensor which uses a piezoelectric device rather than switch contacts as used heretofore. The illustrated sensor includes an insulative housing 78 including a cylindrical body 80, a cap 82 and a base 84. The cylindrical body 80 has an internal ledge 86 which seats a platform 88. The piezoelectric device 90 is positioned a predetermined distance from the platform by means of its periphery being held between a first insulative spacer ring 92 disposed between the device 90 and the platform 88, and a second insulative spacer ring 94 positioned between the device 90 and the cap 82. The inertia sensor 38 also includes a pendulum 96 disposed in the chamber 98 formed by the insulative housing. The pendulum 96 has an enlarged head 100 rockable on the upper surface of the platform 88 and having a cam surface 102 for deflecting the piezoelectric device 90. The pendulum also has a weighted lower end 104 and a stem 106 extending through a central opening 108 in the platform 88 and interconnecting the head 100 and the lower end 104. It will be appreciated that the central opening has dimensions somewhat larger than those of the stem 106 to allow free swinging movement of the stem. Upon the inertia sensor 38 experiencing a predetermined change in velocity, the pendulum swings causing the piezoelectric device 90 to be deflected. The cap 82 includes a pair of spaced electrical terminals 110 extending through the cap 82 and connected by leads to the piezoelectric device. Each terminal includes a metallic tongue 112 for reception by a female quick disconnect.

Referring to FIG. 3, the piezoelectric device 90 preferably includes a thin, resilient brass disc 114 and a thin ceramic PZT layer 116 adhered to the central portion of the disc. As the disc is held about its periphery due to the presence of the spacer rings 92 and 94, operation of the pendulum results in the cam surface 102 of the head 100 bending the central portion of the piezoelectric device including the PZT layer 116. As is well known to those of skill in the art, such a piezoelectric device is, in effect, a mechanical/electrical transducer with the mechanical deflection being translated into an electrical voltage pulse which might have a magnitude of five volts per 0.001 inch deflection of the device. Such a piezoelectric device is the Vernitron Unimorph made by Vernitron Piezoelectric Division of Bedford, Ohio.

The electrical circuit 39 to which the inertia sensor 38 is connected is also shown to FIG. 2 and is energized from the positive terminal V+ of the vehicle battery preferably through the ignition switch S1. One terminal 110 of the inertia sensor 38 is grounded to the vehicle chassis and the other terminal 110 is connected to one lead of a potentiometer P1, the other lead of which is grounded. The wiper arm of the potentiometer P1 is connected to the base of a invertor NPN transistor T1.

The emitter of the transistor is grounded and the collector is connected to the positive voltage V+ through a current limiting resistor R1. The collector of transistor T1 is also connected to a timer circuit 118, the timing period of which is controlled by a capacitor C1 and resistor R4. The output of the timer 118 is connected to ground through a voltage divider made up of resistors R2 and R3. The junction of these resistors is connected to the base of an NPN transistor T2 which is connected in a Darlington pair configuration with an NPN transistor T3. The emitter of transistor T3 is grounded while the collectors of the transistors T2 and T3 are commonly connected to the positive voltage supply through the coil 76. Several coils 76 are shown in series connection as a single inertia sensor 38 and a single electrical circuit 39 can control operation of a number of retractor mechanisms 32,34. Depending upon their operational characteristics the coils 76 might be connected in parallel. The coils are shunted by a diode D1 the cathode of which is connected to V+ with the anode of D1 connected to the collectors of transistors T2 and T3 to take care of an inductively generated current spike generated by the collapsing of the magnetic fields in the coils.

The timer 118 may be part number MC 1455G 7404 manufactured by Motorola. Internally, the timer 118 includes an RS flip-flop FF1 with the Q̄ output being commonly connected to an inverter I1 and the base of a NPN transistor T4. The output of the inverter I1 is connected to the voltage divider formed by resistors R2 and R3 while the collector of the transistor T4 is connected to the capacitor C1 and to V+ through a resistor R4. The emitter of the transistor T4 is connected to ground. The timer also includes a voltage divider formed by the series combination of resistors R5, R6 and R7. The junction of resistors R5 and R6 is connected to the inverting input of a comparator OP1 with the junction of capacitor C1 and R4 connected to the non-inverting input of comparator OP1. The junction of resistors R6 and R7 is connected to the non-inverting input of a comparator OP2 with the inverting input of OP2 connected to the collector of the transistor T1. The output of comparator OP1 is connected to the R input of the flip-flop FF1 while the output of comparator OP2 is connected to the S input of FF1.

Operation of the circuit 39 is as follows: Upon the inertia sensor 38 sensing a sufficient change in velocity of the vehicle (for example, over 0.7 G), it provides a voltage spike output to the potentiometer P1. The wiper arm of P1 provides an input signal to the base of transistor T1 rendering it conductive which provides a low at the inverting input of comparator OP2. Since a higher signal is present at the non-inverting input, OP2 provides a signal to the flip-flop F1 setting it, which causes a low at the Q output. This low is inverted by inverter I1 which applies a signal to the base of transistor T2 causing the transistors T2 and T3 to conduct thereby energizing the coil 76, which provides a magnetic field opposing that of the permanent magnet 74 to lower the G-force needed to operate the locking components of the shoulder retractor mechanism 32. The low logic level output of the flip-flop FF1 also turns off the transistor T4 which allows the capacitor C1 to charge through the resistor R4. When the capacitor C1 is sufficiently charged that the signal at the non-inverting input of OP1 is sufficiently greater than the signal at the inverting input thereof, the comparator OP1 provides a high signal to the reset input of the flip-flop FFI causing it to change states with the Q̄ output providing a high signal which renders transistor T4 conductive to discharge the capacitor C1, and which further turns off the transistors T2 and T3 to deenergize the coil 76. Of course, the time that the timer 118 maintains the coil 76 energized can be varied by changing the values of the resistor R4 and/or the capacitor C1, as is well known to those of skill in the art. The presence of the shunting diode D1 across the coils 76 allows the magnetic field generated by the coils to collapse without a current spike. Thus, the pendulum 40 then requires the greater G-force to cause the retractor mechanism 32 to lock the strap 28 against extension.

Preferred values of components of the electrical circuit 39 are as follows: R1=1K, R2=2.7K, R3=2.7K, R4=0.47M and C1=3 uf. These values for R4 and C1 result in operation of the timer 118 to keep the coil 76 energized about 1.5 seconds after the inertia sensor provides a voltage spike of sufficient magnitude to switch the transistor T1. Transistor T1 can be part number 2N3643, transistor T2 can be part number 2N3643 and transistor T3 can be part number 2N3055, all manufactured by General Electric.

Referring to FIG. 6, an alternative embodiment of a retractor mechanism 32A for use with the inertia sensor 38 and electrical circuit 39 is shown. Components of retractor mechanism 32A which correspond to components of the retractor mechanism 32 are indicated by the numeral assigned to the retractor mechanism 32 with the addition of the suffix "A". In the retractor of mechanism 32A, a pendulum is not utilized, instead a solenoid 118 is provided the coil 76A of which is interconnected in the circuit 39. The solenoid is mounted on the support bar 42A and extension of the solenoid plunger 120 in response to energization of the solenoid coil 76A, causes the pawl 44A to swing to its locking position. The solenoid 118 is inverted so that as it pulls in its plunger 120 into the coil 76A the upper end extension 120A on the plunger pushes upwardly against the pawl 44A. The pawl may be biased by a coil spring 122 to its non-locking position. While the retraction mechanism 32A is somewhat simpler than the retractor mechanism 32, the retraction mechanism 32A does not provide the dual force operation function of the mechanism 32.

It will be appreciated that the use of the inertia sensor 38 and electrical circuit 39 allows a number of retractor mechanisms 32, 34 to be operated by a single inertia sensor 38. It will also be appreciated that piezoelectric device can be used in lieu of the rolling ball or electrical contact devices which make or break switches which can become dirty or corroded. The piezoelectric device may be used with conventional solenoid operated systems in which the solenoid is energized at a predetermined force level, e.g. .7G to assure that the retractor reel is locked. Manifestly, the piezoelectric need not be used with two force level operation or with magnetic operations as herein preferred.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Seat belt retraction apparatus for use in a vehicle having at least one door and a chassis, said apparatus comprising:

a seat belt retractor mechanism including a reel about which the strap of the seat belt is wound and which is adapted to take up and let out said strap, a locking means moveable into a locking position to prevent said reel from paying out said strap, said locking means being movable between the locking position and a release position in which said reel is free to rotate to pay out or to retract the strap, an inertia sensor mounted on said vehicle and including a piezoelectric device and means for changing the shape of said device so that said device provides an output signal in response to a change in velocity of said vehicle; and an electrical circuit means connected with said inertia sensor and said locking means and comprising control means responsive to operation of said inertia sensor to operate said locking means to its locking position whereby a change in velocity of said vehicle causes a locking of the reel against pay out of the strap.

2. Apparatus as set forth in claim 1 wherein said vehicle has at least two doors and said apparatus includes a said retractor mechanism carried by each door, said single inertia sensor controlling a plurality of seat belt retractor mechanisms.

3. Apparatus as set forth in claim 1 wherein said retractor mechanism is carried by said door and said inertia sensor is carried by said chassis whereby opening of said door does not cause said inertia sensor to provide said output signal.

4. Apparatus as set forth in claim 1 wherein said electrical circuit means includes a timer and a coil to operate the locking means to its locking position and the timer is responsive to said output signal to energize said coil for a predetermined length of time.

5. Apparatus as set forth in claim 1 wherein said piezoelectric device comprises a disc.

6. Apparatus as set forth in claim 5 wherein said sensor comprises an insulative housing having means for supporting said disc adjacent its periphery.

7. Apparatus as set forth in claim 6 wherein said means for changing the shape includes a pendulum supported for swinging movement in predetermined relationship with said disc.

8. Apparatus as set forth in claim 7 wherein said pendulum comprises an enlarged head end having a cam surface for deflecting said disc, a weighted lower end and a stem interconnecting said head and said lower end.

9. Apparatus as set forth in claim 8 wherein said sensor comprises a support platform held about its periphery by said housing a predetermined distance from said disc, said platform having an aperture enlarged with respect to said stem for passage of said stem with said head disposed between platform and said disc, the predetermined distance being such that swinging of said pendulum causes said head to deflect said disc.

10. An inertia sensor for mounting on a vehicle chassis for controlling energization of a locking means in a seat belt retraction mechanism, said sensor comprising:

an insulative housing having an internal chamber;

a piezoelectric device comprising a disc supported about its periphery inside said chamber;

an inertia weight disposed in said chamber and deflecting said disc upon movement of the inertia weiqht with a change in velocity of the vehicle, and terminal means interconnected with said peizoelectric device whereby a change of velocity of said vehicle results in said inertia sensor providing an output signal at said terminal means.

11. An inertia sensor in accordance with claim 1 in which said inertia weight comprises a pendulum having a lower weighted end mounted for swinging movement in the housing.

* * * * *